United States Patent
Pani et al.

(10) Patent No.: US 9,532,282 B2
(45) Date of Patent: Dec. 27, 2016

(54) HOME NODEB (HNB) MOBILITY IN A CELL FORWARD ACCESS CHANNEL (CELL_FACH)STATE

(75) Inventors: Diana Pani, Montreal (CA); Mahmoud Watfa, Saint Leonard (CA); Paul Marinier, Brossard (CA); Pascal M. Adjakple, Great Neck, NY (US); Virgil Comsa, Montreal (CA); Ulises Olvera-Hernandez, Kirkland (CA); J. Patrick Tooher, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 13/162,690

(22) Filed: Jun. 17, 2011

(65) Prior Publication Data

US 2012/0064903 A1 Mar. 15, 2012

Related U.S. Application Data

(60) Provisional application No. 61/356,481, filed on Jun. 18, 2010, provisional application No. 61/374,180, (Continued)

(51) Int. Cl.
*H04W 36/00* (2009.01)
*H04W 88/02* (2009.01)
*H04W 88/08* (2009.01)

(52) U.S. Cl.
CPC ......... *H04W 36/0088* (2013.01); *H04W 88/02* (2013.01); *H04W 88/08* (2013.01)

(58) Field of Classification Search
CPC ...... H04W 28/00; H04W 28/16; H04W 28/18; H04W 36/0083; H04W 36/0088; H04W 36/0094; H04W 84/045; H04W 88/08; H04W 88/02

(Continued)

(56) References Cited

U.S. PATENT DOCUMENTS 6,212,368 B1 4/2001 Ramesh et al.
8,111,628 B2 2/2012 Yin
(Continued)

FOREIGN PATENT DOCUMENTS

CN 1794864 A 6/2006
CN 101682852 A 3/2010
(Continued)

OTHER PUBLICATIONS

3rd Generation Partnership Project (3GPP), TS 25.469 V9.2.0, "3rd Generation Partnership Project; Technical Specification Group Radio Access Network; UTRAN Iuh interface Home Node B (HNB) Application Part (HNBAP) signalling (Release 9)", Jun. 2010, 62 pages.

3rd Generation Partnership Project (3GPP), TS 25.331 V9.2.0, "3rd Generation Partnership Project; Technical Specification Group Radio Access Network; Radio Resource Control (RRC); Protocol Specification (Release 9)", Mar. 2010, 1784 pages.

3rd Generation Partnership Project (3GPP), R2-092424, "Issues with UE autonomous search function for Home-eNB cells", Samsung, 3GPP TSG-RAN WG2 Meeting #65bis, Seoul, Rep. Korea, Mar. 23-27, 2009, 2 pages.

(Continued)

*Primary Examiner* — Michael Mapa
(74) *Attorney, Agent, or Firm* — Condo Roccia Koptiw LLP

(57) ABSTRACT

Disclosed herein are systems and methods for managing home nodeB (HNB) mobility in forward access channel (Cell_FACH) states. According to an aspect, a method may be implemented at a Wireless Transmit/Receive Unit (WTRU). The method may include determining whether to communicate an indication to a network node for extended measurement occasion. Further, the method may include communicating the indication to the network node in response to determining to communicate the indication.

20 Claims, 5 Drawing Sheets

Related U.S. Application Data filed on Aug. 16, 2010, provisional application No. 61/388,989, filed on Oct. 1, 2010, provisional application No. 61/470,726, filed on Apr. 1, 2011.

(58) Field of Classification Search
USPC .............. 455/434, 161.1, 411, 423–425, 455/450–452.2, 435.1–444; 370/252, 329–331

See application file for complete search history.

(56) References Cited

U.S. PATENT DOCUMENTS

| | | | |
|---|---|---|---|
| 8,400,934 | B2 | 3/2013 | DiGirolamo et al. |
| 2003/0185162 | A1* | 10/2003 | Fraser ............... H04W 52/0277 370/311 |
| 2005/0117533 | A1* | 6/2005 | Cave ............................. 370/321 |
| 2006/0079262 | A1* | 4/2006 | Harris et al. ................. 455/520 |
| 2007/0111741 | A1* | 5/2007 | Roberts ........................ 455/515 |
| 2008/0170557 | A1 | 7/2008 | Yin |
| 2008/0189970 | A1* | 8/2008 | Wang ............... H04W 36/0055 33/701 |
| 2008/0220792 | A1* | 9/2008 | Fischer ...................... 455/452.2 |
| 2009/0092097 | A1* | 4/2009 | Nylander .......... H04W 36/0061 370/331 |
| 2009/0131081 | A1* | 5/2009 | Abdel-Kader et al. .... 455/456.6 |
| 2009/0163199 | A1* | 6/2009 | Kazmi et al. ................. 455/425 |
| 2009/0196197 | A1 | 8/2009 | DiGirolamo et al. |
| 2009/0239533 | A1 | 9/2009 | Somasundaram |
| 2009/0285166 | A1 | 11/2009 | Huber et al. |
| 2010/0120426 | A1* | 5/2010 | Singh et al. ................ 455/435.1 |
| 2011/0009095 | A1 | 1/2011 | Uemura et al. |
| 2012/0051258 | A1* | 3/2012 | Josso ................ H04W 36/0088 370/252 |
| 2012/0164979 | A1* | 6/2012 | Bachmann ............ H04L 63/164 455/411 |

FOREIGN PATENT DOCUMENTS

| | | |
|---|---|---|
| CN | 102027727 A | 4/2011 |
| EP | 1646261 A2 | 4/2006 |
| EP | 2196059 A1 | 6/2010 |
| JP | 2002/517126 A | 6/2002 |
| JP | 2009/117658 A | 5/2009 |
| JP | 2011/515031 | 5/2011 |
| JP | 2011/518471 | 6/2011 |
| JP | 2013-532445 A | 8/2013 |
| WO | WO 99/62203 A2 | 12/1999 |
| WO | WO 2008/085952 A1 | 7/2008 |
| WO | WO 2009/099938 | 8/2009 |
| WO | WO 2009/045149 A1 | 9/2009 |
| WO | WO 2009/116427 | 9/2009 |
| WO | WO 2009/117658 | 9/2009 |

OTHER PUBLICATIONS

3rd Generation Partnership Project (3GPP), R4-100214, "LS on CSG mobility performance", TSG-RAN WG2, 3GPP TSG RAN WG4 Meeting #AH01, Sophia Antipolis, Jan. 18-22, 2010, 2 pages.

European Telecommunications Standards Institute (ETSI), TS 125 367 V9.4.0, "Universal Mobile Telecommunications System (UMTS); Mobility procedures for Home Node B (HNB); Overall description; Stage 2 (3GPP TS 25.367 version 9.4.0 Release 9)", Jun. 2010, 18 pages.

European Telecommunications Standards Institute (ETSI), TS 136 304 V9.2.0, "LTE; Evolved Universal Terrestrial Radio Access (E-UTRA); User Equipment (UE) procedures in idle mode (3GPP TS 36.304 version 9.2.0 Release 9)", Apr. 2010, 34 pages.

3rd Generation Partnership Project (3GPP), Tdoc R2-097463, "LS on CSG Mobility Performance", Rel-9, 3GPP TSG-RAN WG2 Meeting #68 Jeju, Korea, Nov. 9-13, 2009, 2 pages.

3rd Generation Partnership Project (3GPP), R4-081075, "Considerations on mobility for Enhanced Uplink for CELL_FACH state and Enhanced UE DRX", TSG-RAN WG4 Meeting #47, Kansas City, Kansas, USA, May 4-9, 2008, 4 pages.

\* cited by examiner

HOME NODEB (HNB) MOBILITY IN A CELL FORWARD ACCESS CHANNEL (CELL_FACH) STATE

CROSS REFERENCE TO RELATED APPLICATIONS

This application claims the benefit of U.S. Provisional Patent Application No. 61/356,481, filed Jun. 18, 2010, U.S. Provisional Patent Application No. 61/374,180, filed Aug. 16, 2010, U.S. Provisional Patent Application No. 61/388,989, filed Oct. 1, 2010, and U.S. Provisional Patent Application No. 61/470,726, filed Apr. 1, 2011; the contents of which are hereby incorporated by reference in their entireties.

BACKGROUND

Home nodeB (HNB) mobility in UTRAN R9 may apply in cases when a wireless transmit/receive unit (WTRU) (also referred to herein as user equipment (UE)) is in either an idle or connected mode. In the former mode, the WTRU may move into (or out of) an HNB by performing cell reselection that may need to fulfill several criteria, which may include signal strength and membership status. The WTRU may know whether or not it is a member of a closed subscriber group (CSG) cell or hybrid cell to which a HNB belongs by comparing a CSG identity (CSG ID) that it has in its whitelist with the CSG ID that is broadcast by a CSG cell. It is noted that a cell is known to be a CSG or hybrid cell by checking the value of the CSG indicator bit in the MIB. Moreover, the CSG ID may be retrieved by reading SIB3. Idle mode reselection into a HNB may be executed by the WTRU without interaction with the source base station (e.g., NB or HNB).

In Cell_DCH connected mode, the WTRU may be handed over to an HNB based on possible proximity indications and measurement reporting. In order to send a proximity indication (which may indicate that the WTRU is entering or leaving a location where a CSG cell or hybrid cell may exist), the WTRU may first be configured to do so via radio resource control (RRC) messaging. If the WTRU sends a proximity indication, the NB may send a request to the WTRU to perform measurements on certain cells and may read and report the CSG ID from the cell and whether the WTRU is a member or not.

Although HNB mobility in a cell forward access channel (Cell_FACH) state is typically considered to be a connected mode of operation, with the exception of traffic volume reporting, a WTRU transmitting in Cell_FACH typically does not perform measurement reporting to a base station (e.g., NB or HNB). However, the WTRU may still measure other cells (e.g., inter-frequency or inter-RAT) for example for the purpose of performing cell reselection. The WTRU, if it reselects to another cell, may then perform a cell update procedure for example to let a UTRAN know about its new location at the cell level as the WTRU can receive user plane and control plane data in Cell_FACH. Even if the WTRU does not reselect to a new cell in Cell_FACH, the WTRU can perform a cell update procedure (e.g., upon expiration of a periodic cell update timer). In order to perform measurements in Cell_FACH, the WTRU typically makes use of occasions during which no data will be sent to the WTRU—known as FACH measurement occasions. FACH measurement occasions typically have a fixed length that is a multiple of 10 milliseconds and are repeated according to some parameters that are known to the WTRU.

In order to perform inbound mobility to an HNB while in Cell_FACH, a WTRU may need to read the MIB and SIB3 of a HNB for the purpose of identifying the CSG ID and thereafter verify if it is a member or not (based on comparison with the IDs in the WTRU's whitelist). Two problems that may arise are: (1) the FACH measurement occasions may not be long enough for the WTRU to read the MIB and/or SIB3 of the target cell in the other frequency or RAT; and (2) the FACH measurement occasion may not coincide with the time that the MIB and/or SIB3 of the (potential) target HNB are broadcasted. Even though the WTRU may autonomously choose to prolong its measurement occasions in order to acquire the MIB/SIB3 of the HNB cell, it may lose data while doing so since the HNB in the source cell may be unaware of the WTRU's absence.

Another difficulty associated with Cell_FACH mobility involves the procedure of fetching a WTRU's context by a target HNB (i.e., from the source HNB, both of which are connected to the same HNB gateway (HNB-GW)). This difficulty may arise due to the assignment of the same U-RNTI to two or more WTRUs by different HNBs that are connected to the same HNB GW. The contents of the U-RNTI may include a radio network controller identifier (RNC ID) and the serving RNTI (S-RNTI). The RNC ID is the HNB GW's identity. The S-RNTI is allocated by the HNB. If, e.g., two HNBs coincidentally allocate the same S-RNTI to different WTRUs that are served by the HNBs, then the WTRUs may have the same U-RNTI as the RNC ID is common since both HNBs are connected to the same HNB GW. In such a scenario, if a WTRU performs cell update to a potential target HNB (as part of Cell_FACH mobility), the WTRU may provide its U-RNTI for identification. This may allow the target HNB to contact the source HNB for the purpose of fetching the WTRU's context. It is noted that a WTRU context may be identified by a context ID and may contain information about the WTRU's configuration (e.g. RAB information). The target HNB may initially contact the HNB GW and may then provide the U-RNTI of the WTRU in question. The HNB GW may then try to map a context ID based on the provided U-RNTI. However, if two or more WTRUs have the same U-RNTI, then the HNB GW may get two context IDs, one for each of the WTRUs that is allocated to the same U-RNTI. At this point, the HNB GW/target HNB may not fetch the appropriate context of the WTRU due to the non-uniqueness of the U-RNTI.

Other problems related to Cell_FACH mobility involve the handling of neighbor cell lists (NCLs) being configured with mixed CSG cells and non-CSG cells. For example, one issue relates to CSG-capable WTRU behavior when it detects a CSG cell in the NCL that it is not a member of.

Accordingly, there is a need to provide systems and methods to address the aforementioned difficulties.

SUMMARY

Disclosed herein are systems and methods for managing HNB mobility in Cell_FACH states. According to an aspect, a method may be implemented at WTRU. The method may include determining whether to communicate an indication to a network node for extended measurement occasion. Further, the method may include communicating the indication to the network node in response to determining to communicate the indication.

According to another aspect, a method may be implemented at a network node servicing a WTRU. The method may include receiving an indication from the WTRU for extended measurement occasion. Further, the method may include preventing traffic from being sent to the WTRU in response to receiving the indication.

According to yet another aspect, a method implemented at a WTRU may include determining that the WTRU is not a member of a cell in an NCL. The method may also include restricting activity with the cell in response to determining that the WTRU is not a member of the cell.

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to any limitations that solve any or all disadvantages noted in any part of this disclosure.

DETAILED DESCRIPTION

In accordance with embodiments, systems and methods disclosed herein may inform an NB or other network node that a WTRU will be absent for some time that is longer than the FACH measurement occasion so that the WTRU does not lose data from its source cell and also to provide the WTRU with enough time to fetch the MIB/SIB3 of a HNB cell. In addition, systems and methods disclosed herein may be used to force a WTRU in a state where the WTRU can perform inter-frequency or inter-RAT measurements without risk of losing traffic or information addressed to the WTRU by a serving cell. Further, when a WTRU in Cell_FACH mode reselects to another cell, the WTRU may use a cell update procedure. The new cell may be a CSG cell. In such a scenario, the HNB may require query of the core network (CN) to perform access control. In accordance with embodiments of the present disclosure, systems and methods are provided for querying the CN to perform access control outside of a typical HO procedure. Furthermore, it may be needed to perform cell reselection that is transparent to the CN. Disclosed herein are systems and methods for ensuring that the WTRU has membership to the CSG of the target HNB in a manner that does not require CN involvement.

In order to ensure that a WTRU will not lose data from its source cell, and also to provide the WTRU with enough time to retrieve the MIB/SIB3 of a targeted HNB cell, the WTRU may provide an indication to the network (source node, i.e., HNB or RNC), for example to inform the network that the WTRU will be absent for some time that is longer than the default FACH measurement occasion. For example, the WTRU may send an indication to the network source node, such as an HNB or an RNC, indicating that the WTRU requires one or more extended measurement occasions for the purpose of reading the MIB and/or SIB3 of a potential target CSG or hybrid cell. This indication may serve as a request by the WTRU for permission to utilize an extended measurement occasion. In response to the indication from the WTRU, the source node may provide extended time during which no data is sent to the WTRU.

Figure 1:
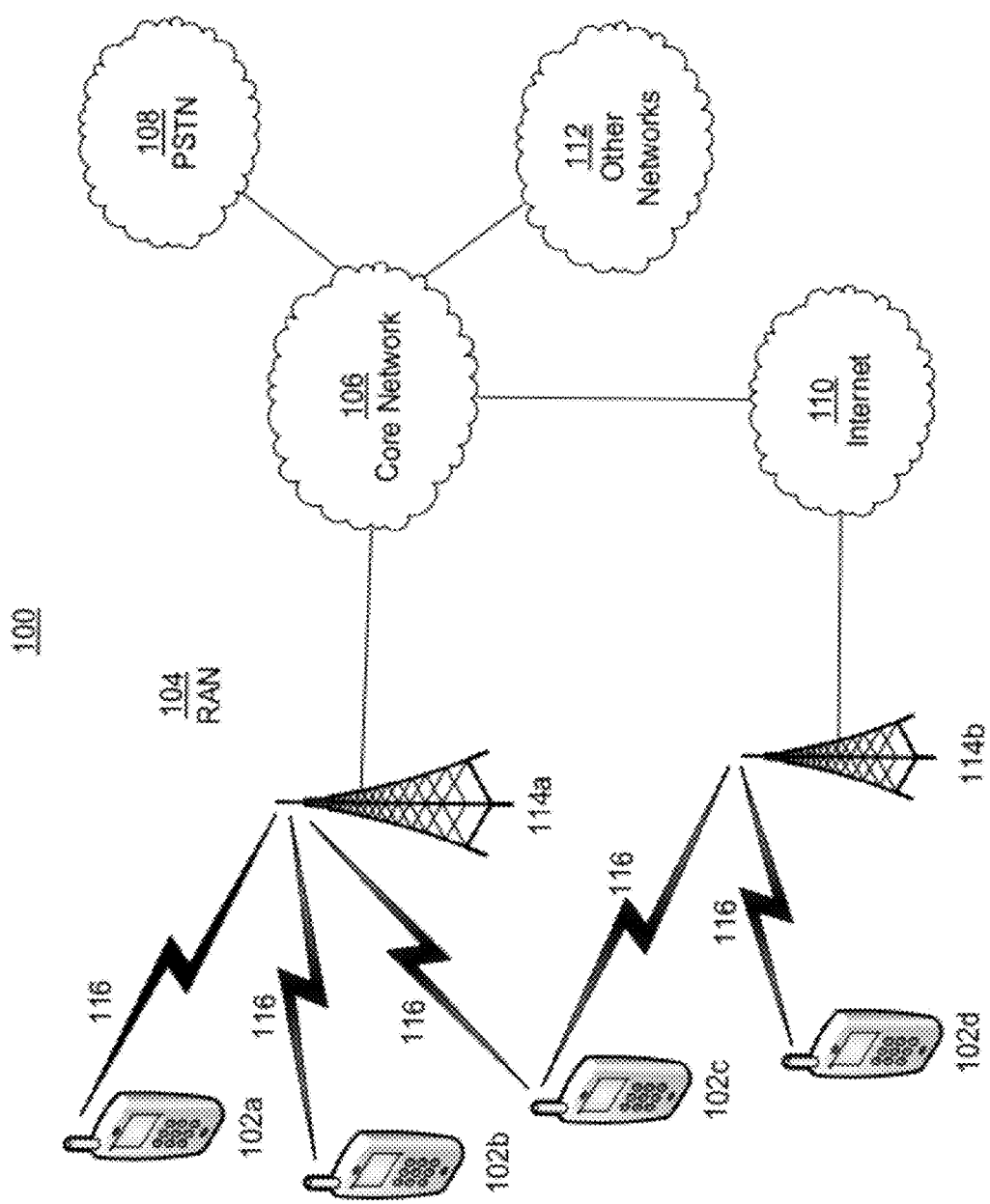
FIG. 1 is a system diagram of an example communications system in which one or more disclosed embodiments disclosed herein may be implemented.

FIG. 1 is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1, the communications system 100 may include WTRUs 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1 may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1 may be configured to communicate with the base station 114a, which may employ a cellular-based radio technology, and with the base station 114b, which may employ an IEEE 802 radio technology.

Figure 2:
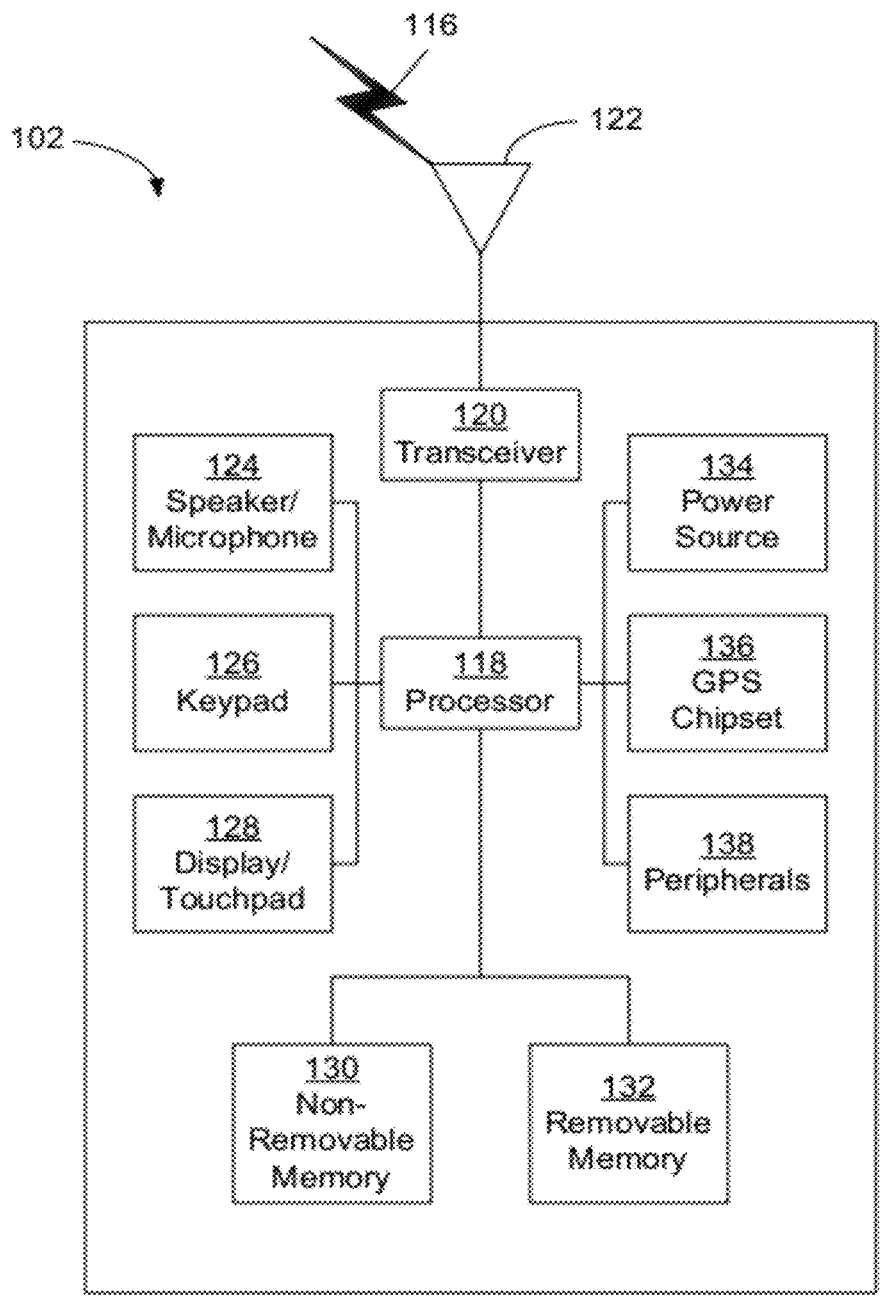
FIG. 2 is a system diagram of an example WTRU, e.g., a UE, that may be used within the communications system illustrated in FIG. 1.

FIG. 2 is a system diagram of an example WTRU 102. As shown in FIG. 2, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 2 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 2 as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a BLUETOOTH® module, a frequency modulated (FM) radio unit, a digital music player, a media player, a video game player module, an Internet browser, and the like.

Figure 3:
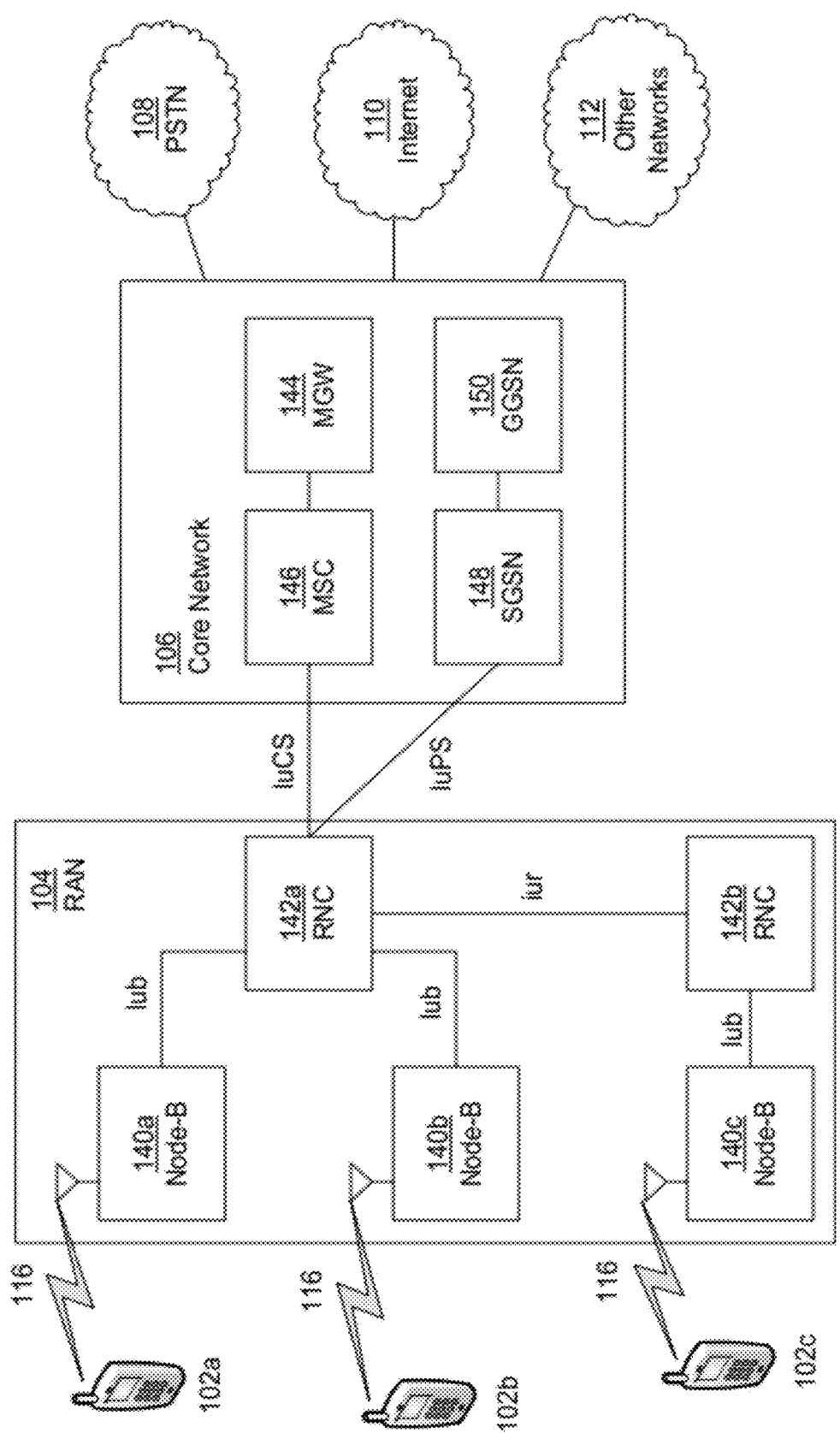
FIG. 3 is a system diagram of an example radio access network and an example core network that may be used within the communications system illustrated in FIG. 1.

FIG. 3 is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in commuication with the core network 106. As shown in FIG. 3, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 3, the Node-Bs 140a, 140b may be in communication with the RNC 142a. Additionally, the Node-B 140c may be in communication with the RNC 142b. The Node-Bs 140a, 140b, 140c may communicate with respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 3 may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to the circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 4:
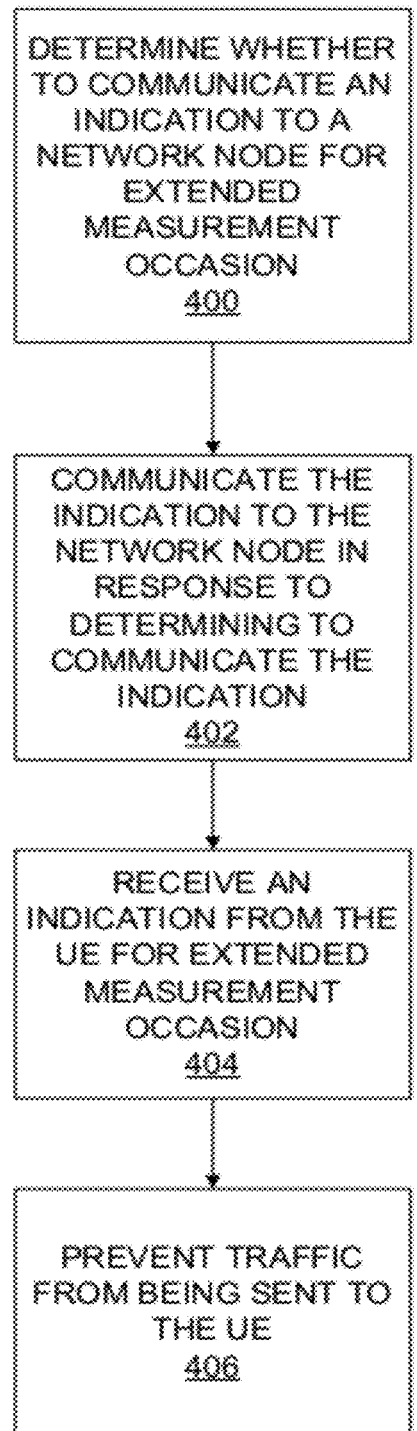
FIG. 4 is a flow chart of an example method of sending an indication to a network for one or more extended measurement occasions in accordance with embodiments of the present disclosure.

FIG. 4 illustrates a flow chart of an example method of sending an indication to a network for one or more extended measurement occasions in accordance with embodiments of the present disclosure. The method of FIG. 4 may be implemented by suitable WTRU such as the WTRU shown in FIG. 2.

Referring to FIG. 4, the method may include determining whether to communicate an indication to a network node for extended measurement occasion (step 400). For example, the processor 118 may implement instructions for determining whether to communicate an indication to a network node for one or more extended measurement occasions. One or more events configurations, and the like disclosed herein may act as triggers for the WTRU to determine to communicate the indication to the network node.

The method of FIG. 4 may also include communicating the indication to the network node in response to determining to communicate the indication (step 402). Continuing the example described with respect to step 400, the processor 118 may implement instructions to control the transmit/receive element 122 to communicate a message to the base station that contains the indication for an extended measurement occasion. The message may be communicated to any network node servicing the WTRU.

The method of FIG. 4 may include receiving an indication from the WTRU for extended measurement occasion (step 404). For example, referring to FIG. 1, the base station 114a may receive a message from the WTRU 102a that contains an indication for one or more extended measurement occasions for the WTRU 102a. The message may include an identifier of the WTRU 102a.

Further, the method of FIG. 4 may include preventing traffic from being sent to the WTRU in response to receiving the indication (step 406). For example, the base station 114a shown in FIG. 1 may include one or more processors for determining that a received message includes an indication for one or more measurement occasions for a WTRU. In response to receipt of the message, the base station 114a may prevent communications from being sent to the WTRU.

Example events, configurations, and the like that may act as triggers to thereby cause a WTRU to send an indication to the network node for one or more extended measurement occasions are described in this section. In an example, a WTRU may be configured to send such indications while in a Cell_FACH state. Such configuration can be implemented via dedicated (RRC) signaling (note that the actual type of indication may be, e.g., a proximity indication, a cell update, etc., as described in more detail herein. It is noted that the indications described herein may be applied to any type of actual indications sent). For example, the indications may be part of handover (HO) messages, e.g., during both intra-UTRAN and inter-RAT HO from a GSM EDGE radio access network (GERAN)/E-UTRAN.

In another embodiment, a network node may broadcast whether or not a request for an extended measurement occasion may be sent. For example, the base station 114a may send a message to the WTRU 102a to indicate that a request for extended measurement occasion should not be sent. In this example, the WTRU 102a may receive the message, and may prevent such indications from being sent to the network node. The base station 114a may subsequently send a message the WTRU 102a for allowing such indications from the WTRU 102a. Example network nodes for broadcasts include, but are not limited to, an HNB/RNC (or UTRAN).

In an embodiment, a WTRU can be configured to always send an indication of extended measurement occasion if a triggering condition is met (e.g., determining that the WTRU is in close proximity to a CSG) and if the WTRU is configured to send proximity indication in Cell_DCH mode.

The WTRU may send the indication if it is within sufficiently close proximity to the network node. For example, the WTRU may determine whether its proximity to a CSG is within a predetermined threshold. In response to determining that it is within the predetermined threshold, the indication may be communicated to a network node.

In another embodiment, triggering can occur in response to the updating of the WTRU's list of allowed CSG IDs.

In another embodiment, triggering can occur in response to detection that the WTRU is in close proximity to a CSG cell or hybrid cell. For example, this may be based on a WTRU's fingerprint information. The WTRU may determine whether its proximity to a CSG cell is within a predetermined threshold. The WTRU may communicate the indication in response to determining that the proximity of the WTRU to the CSG cell is within the predetermined threshold. In another embodiment, triggering can occur in response to detection that the WTRU is no longer is close proximity to a CSG cell or hybrid cell. The indication may contain this information.

In another embodiment, triggering can occur in response to a request to perform a manual CSG scan and selection while in the Cell_FACH mode.

In another embodiment, triggering can occur when a WTRU changes an RNC, mobile switching center (MSC)/serving general packet radio service support node (SGSN), or location/routing area.

In another embodiment, triggering can occur in response to a determination that the WTRU is in close proximity of a CSG cell or hybrid cell that is in the WTRU's whitelist and upon detection of a suitable cell on the corresponding other frequency. The WTRU may use the FACH measurement occasions or any other type of measurement occasions, such as discontinuous reception (DRX) to measure the channel quality of the primary scrambling code (PSC) on the other frequency or RAT. If a suitable cell is found on that frequency and the WTRU determines that it is in proximity, the WTRU may send the indication to the network.

In yet another embodiment, a WTRU may trigger the indication based on the PSC. For example, the indication may be sent if the WTRU, in combination with the triggers above, also determines that the suitable PSC or the strongest PSC in that frequency corresponds to the HNB which is in its whitelist.

In another embodiment, a WTRU may perform cell reselection to another cell and determine that the triggering criteria as above are still met after reselection. For example, the WTRU may determine whether to communicate an indication in response to determining cell reselection. It is also noted that any of the above triggering criteria may be combined before triggering the sending of an indication for extended measurement occasion.

When a WTRU receives an indication for an extended measurement occasion, the network can take any combination of various actions described herein. In an example, a WTRU may determine a type of indication to send, for example, based upon the type of triggering event and/or configuration. An example type of indication that can be sent by the WTRU to the network node or network includes a proximity indication such as an RRC message. The message may include additional information to differentiate the proximity indication in the Cell_FACH state from a similar proximity indication in the Cell_DCH state.

In an embodiment, a WTRU may send a cell update message to a source network node as an indication. This message may be sent even if the periodic cell update timer has not expired, but one or more of the above-mentioned triggers have been met. The message may include a new update cause, e.g. a proximity indication in Cell_FACH on another frequency or RAT.

In another embodiment, an RRC message may be sent to a network node for providing indication in Cell_FACH.

Various actions, in any combination, can be taken by a WTRU after sending an indication to a network node or network for an extended measurement occasion. For example, after sending an indication, a WTRU may proceed with utilizing an extended measurement occasion. The WTRU may also reselect to a targeted HNB/CSG/hybrid cell or return to/remain with the source network node. Further, the WTRU may wait for a confirmation that the indication has been sent to and/or received by the network node (e.g., NB or HNB) before utilizing the extended measurement occasion and determining whether to reselect to the targeted HNB/CSG/hybrid cell.

An example confirmation that may be received by a WTRU includes, but is not limited to, an acknowledgement from lower layers in the WTRU that the message has been transmitted (e.g., an acknowledgement from the RLC layer). Another example confirmation includes an explicit acknowledgement from the source (H)NB/RNC. Another example confirmation includes an implicit acknowledgement (e.g., due to lack of a reject message from the source HNB within a default or preconfigured time after sending the indication). Yet another example confirmation includes an RRC acknowledgment message (e.g., in response to an RRC message that was sent by the WTRU as an indication, as described herein above). Further, for example, any of these example confirmations may be combined in any suitable way.

When a network node (e.g., HNB, RNC, and the like) receives one or more of the aforementioned indications for an extended measurement occasion, or an equivalent type of indication, an example action taken by the source node/network can include, but is not limited to, the network node allowing the WTRU to perform extended measurements. Further, for example, the network node may schedule traffic intended for the WTRU based on the extended measurement occasion. In the case of a macro cell configured as a CSG cell or hybrid cell, the RNC may communicate the extended measurement occasions to the NB. The NB may then take this information into account while scheduling traffic, such as high speed downlink shared channel (HS-DSCH) traffic, for the WTRU such that the WTRU does not miss data addressed to it. Alternatively, the RNC may notify the NB of the start and/or stop points of the extended measurement occasions. The NB may then avoid transmitting data to the WTRU during the extended measurement time interval.

In an embodiment, a source node/network (e.g., HNB, RNC, and the like) may respond to an indication from an WTRU with an acknowledgement as disclosed herein. The response can either be positive (i.e., the WTRU is allowed to perform extended measurements) or negative (i.e., the WTRU should keep using the current measurement occasions). The response may be based on, for example, the network node having downlink data for the WTRU.

In the instance of a positive response from the network, the network node may include the extended time that the WTRU can use for measurement in Cell_FACH. This time can be interpreted as the total time allotted or the extended time that is allotted in addition to the current measurement occasion length. Such details of how the time is interpreted by the WTRU may be preconfigured in the WTRU. Moreover, if the time is included, it can be in the form of an integer which can be interpreted by the WTRU as a multiple of a preconfigured time interval or a multiple of the WTRU's current measurement duration.

In an embodiment of a WTRU receiving a positive response, the WTRU can apply an extended measurement occasion based on an FACH measurement occasion cycle length coefficient that is broadcast by the cell. Even though it is broadcast, the WTRU may not apply the coefficient until the WTRU receives a positive response, or the WTRU may apply the coefficient if it has successfully sent an indication to the source HNB/RNC, for example, as per a lower layer acknowledgement. The coefficient can be transmitted, for example, as part of SIB11 or SIB12 and it can, for example, be used such that it is first added to the current measurement coefficient and the result can then be used to calculate the extended period. In another example, the product of the coefficient and the current FACH measurement occasion length may be used as the extended occasion.

In another embodiment, the network may indicate an extended measurement occasion as suggested from the WTRU. For example, in the indication that is sent by the WTRU, a suggested extended measurement occasion can be included by the WTRU based, for example, on one or more prior attempts to read the MIB/SIB3 of a potential target HNB/CSG/hybrid cell. In addition, the FACH measurement occasion cycle length coefficient or the actual length of the extended period can also be communicated to the WTRU in a response sent to the WTRU, for example, as part of a cell update confirm message or any other response message that acknowledges the WTRU's extended measurement occasion request.

In an embodiment of a WTRU receiving a negative response, the response may be interpreted as an instruction that extended measurement occasions are not allowed and the WTRU should keep using the current measurement occasion periods. In another embodiment, a source HNB/RNC can indicate that the WTRU should wait for the next Mth occasion before it applies an extended occasion—the duration of which can be included or can be preconfigured in the WTRU. The value of M can also be included in the response or preconfigured in the WTRU. It is noted that receipt of a negative response at the WTRU does not mean that the WTRU is prohibited from sending further indications. In an embodiment, the negative response may also include an indication that prohibits the sending of such indications from the WTRU in Cell_FACH until the WTRU receives a dedicated configuration to allow the sending of such indications.

It is noted that the above-described actions and/or responses from the network to indications from a WTRU can take the form of any RRC message such as a cell update confirm, a cell update reject, a new RRC message, a measurement configuration message, and the like, which may be used as a positive or negative response accordingly.

It should be appreciated that the above techniques may be applicable if DRX is configured in the Cell_FACH state and the WTRU does not need to use FACH measurement occasions to measure, for example, if the network broadcasts the normal DRX parameters for Cell_FACH operation. If the cycle of DRX parameter broadcasts is sufficient for the WTRU, the WTRU may not need to trigger any proximity indications to the network. If it is not, the WTRU may send one or more of the above-discussed indications and may in turn extend the DRX cycle using any of the techniques described above. Thus, all of the above-discussed techniques may apply in this case, for example, a DRX extension parameter may be broadcast or provided to the WTRU via dedicated signaling, and the WTRU may use this information to calculate the extended DRX cycle length.

A WTRU may take one or more various actions once it has transmitted an indication to the network pertaining to one or more extended measurement occasions. In an example action, a WTRU may autonomously apply the extended measurement occasion at the start of the FACH measurement occasion or extended DRX, for example, if no response is expected from the network. Alternatively, for example, the WTRU may not apply the extended measurement occasion until it has received confirmation, for example, in the form of an acknowledgment, that the network has received its message. Such an acknowledgment may be in the form of a lower layer acknowledgement, an explicit acknowledgement from the network, and the like. In case the WTRU has sent an indication that it is no longer close to a hybrid or CSG cell, the WTRU may autonomously stop utilizing the extended measurement occasion (i.e. immediately start monitoring the serving cell as per the normal measurement occasion). Alternatively, the WTRU may stop utilizing the extended measurement occasion once it has received confirmation from the network.

In another example action, a WTRU may wait for an explicit response from the network and may act in accordance with the above-discussed responses. If no response is received from the network, the WTRU may retransmit the indication until a response is received from the network.

In another example action, a WTRU may apply a backoff timer. When the backoff timer expires, the WTRU may either retransmit the indication or perform the extended measurement occasion on one or more subsequent occurrences of a FACH measurement occasion. Even if the WTRU receives a positive response from the network to perform extended measurements, the WTRU may not perform the extended measurements if one or more triggers to stop the extended measurement occasion occur as described in more detail herein.

In accordance with the embodiments of the present disclosure, various triggering events may be used, in any combination, to stop the occurrence of extended measurement occasions and/or indications thereof. For example, a WTRU may receive dedicated signaling, for example, from the network for stopping the sending of indications. In another example, a source node/cell and/or network may broadcast that WTRUs shall not send such indications in Cell_FACH. In another example, a WTRU may be configured to not send proximity indication in Cell_DCH, and may subsequently apply the same configuration for Cell_FACH. In an alternative of this example, a WTRU may receive such a configuration explicitly for Cell_FACH, for example, from the network. In another example, a WTRU's list of CSG cells may be modified such that the operator CSG list (OCL) is empty, so the allowed CSG list (ACL) is empty, or both. In another example, a WTRU may be informed that the use of the ACL and/or the OCL is prohibited. In another example, a WTRU may receive a request, for example, from upper layers to go to a connected mode for uplink user data. In another example, a WTRU may have a data volume report to send, for example, if the traffic load on the current cell is above a threshold. In another example, a WTRU may perform a handover to a different cell/RNC, and is informed via HO, or broadcast messages in the target area, that sending such indications is prohibited. In another example, the sending of the indication may be limited by a periodic timer; for example, the WTRU may be prevented from sending more than one indication during any 5 second period. In another example, a WTRU may stop sending the indications, for example, due to a directive from the network based on a failure of N, possibly consecutive, access check failures. In other words, in this example, the WTRU may determine that it is not a member of a HNB as part of the SIB3 reading during an extended measurement occasion, where N is an integer that has either a default value or can be preconfigured with signaling. In yet another example, a WTRU may stop performing extended FACH measurement occasions after a predefined period of time expires and the WTRU has not been able to find a cell which is in the WTRU's whitelist. In this example, the timer may be predefined or configured by the network. In yet another example, a WTRU may determine that it is leaving the proximity of the home NodeB cell. In another example, a WTRU may receive an earthquake and tsunami warning system (ETWS) PRIMARY NOTIFICATION WITH SECURITY over a FACH or an enhanced FACH (HS-DSCH) channel as a trigger. In another example, a WTRU may receive a system information change indication message (with ETWS information and the change of SIBs). In another example, a WTRU may be triggered on determining that it is leaving proximity of the home NodeB cell.

In an embodiment, a WTRU may report that it will not send indications for extended FACH measurements if it was expected, required, requested, or configured to do so, for example, as described in suitable example provided herein. In an alternative example, the WTRU can send such notification if it is no longer within HNB coverage, for example, as per its fingerprint information, or if, for example, the WTRU needs to build a new fingerprint data base and the like.

In accordance with embodiments of the present disclosure, a WTRU may take one or more actions in response to the WTRU being handed over, for example, in Cell_DCH, or performs cell reselection in Cell_FACH or any other state. In an example, a WTRU may indicate to the target HNB/RNC the status of sending the proposed indication in the source HNB/RNC. In an alternative example, if the change of cell was done as part of HO, the WTRU may include a status such as a part of the handover complete message that is sent to the target HNB/RNC. It is noted that the handover complete refers to any message that is sent after a handover, for example, an active set update complete.

In an embodiment, a WTRU may continue with the configuration, for example, the normal or extended measurement occasion that it had in the source HNB/RNC if, for example, it has not received a new configuration or indication about whether or not it is allowed to send such indications. Moreover, if the sending of the indication is guarded by a timer, as described above, the WTRU may optionally reset the timer upon handover or reselection.

In another embodiment, the network (e.g., the HNB/RNC) may provide a configuration of a WTRU to a target HNB/RNC. When the WTRU reads the MIB/SIB3 of a potential target HNB, the WTRU may reselect and send a cell update message to that cell if the WTRU is not a member of that CSG cell. The WTRU may actually be a member of that cell but does not have the CSG ID in its whitelist due to an unsynchronized membership list between the WTRU and the network. The WTRU can, in addition to sending a cell update, send a NAS message, such as a routing or location area update message, in order to know whether it is a member of a particular CSG or not, for example, based on the response it gets from the core network. Alternatively, a new cell update cause may be introduced for this purpose and the HNB can then either perform an access check itself or request the membership status from the core network, for example, an SGSN, and then reject or accept the request based on this membership information. Furthermore, a new reject cause may be introduced for the cell update reject to inform the WTRU that the reason of rejection is due to membership status. If the cell update is accepted, the WTRU may then add the CSG ID to its whitelist. The WTRU may send an indication to the network (at the RRC or NAS layer, or both) to indicate that extended FACH measurement occasions are supported by the WTRU. This can be done at initial access to the system, for example, at first attach, or at handover, or at every connection establishment and/or certain connection establishment, and the like.

In an embodiment, when a WTRU in CELL_FACH performs a cell update, e.g., for causes stated in 3GPP TS 25.331-V9.2.0, for the scenarios where the cell is a CSG cell, the cell may proceed to query the CN for an access control. Similarly, if the cell is a hybrid cell, the cell may proceed to query the CN for membership status verification.

In another embodiment, in order to reduce the signaling, the CSG cell or the hybrid cell may query the CN for an access control or membership verification respectively for a subset of the causes leading a WTRU in CELL_FACH mode to perform a cell update. For example, the CSG cell may query the CN for access control if the cause of the cell update is cell reselection or re-entering service area. In the case of cell reselection, access control may be needed since the WTRU may not be a member of the new CSG cell. In re-entering service area case, access control may be required since the WTRU's membership to the CSG cell may have expired while the WTRU was out of service. Similarly, a hybrid cell may query the CN for membership verification if the cause of the cell update is cell reselection or re-entering service area. In this case, the WTRU may be granted differentiated service quality based on whether or not the WTRU is accessing the hybrid cell as a CSG member or non-CSG member.

A cell update message may be modified to include information necessary for access control or membership verification such as message type, membership check cause, or access control cause, WTRU identity and WTRU capabilities, target cell CSG ID and WTRU initial access control/membership verification result (e.g., member, non-member check).

In an embodiment, when a CSG cell or a hybrid cell receives a cell update from a WTRU it may elect to have the CN perform access control in the case of CSG cell or membership verification in the case of hybrid cell. For example, a cell may initiate a new HNBAP procedure (e.g., access control procedure or membership verification procedure). The parameters for this may be similar to the WTRU register request message of 3GPP TS 25.469-V9.2.0 (message type, membership check cause or access control cause, WTRU identity, WTRU capabilities, WTRU initial access control/membership verification result, e.g., member, non-member check). Once the CN has performed access control and indicated its response to the HNB-GW, the HNB-GW may initiate a suitable HNBAP procedure to state the validity of the membership (e.g., CSG membership validity). The parameters of this procedure may include the message type, the WTRU identity and the membership status (member or not). In an embodiment, a cell may initiate a RANAP procedure (e.g., access control procedure or membership verification procedure). The parameters for this may include message type, membership check cause, or access control cause WTRU identity and WTRU Capabilities, possibly WTRU initial access control/membership verification result, e.g., member, non-member check. Once the CN has performed access control, it may indicate the membership validity by use of a RANAP procedure (e.g., CSG membership validity, access control confirm or membership verification confirm). The parameters may include a message Type, the WTRU identity and the membership status (i.e., member or not-member).

In an embodiment, for cell updates when a WTRU is in Cell_FACH, the access control may be performed at the HNB-GW.

In another embodiment, when a WTRU is in Cell_FACH, a cell update may be accepted and may not lead to an access control procedure. In such a case, the WTRU's cell update procedure may be accepted and transparent to either the HNB-GW (the node playing the GW role to the target cell) or the CN or both. Once the WTRU is moved to Cell_DCH, the cell may handover to the WTRU to a CSG cell where the WTRU is a member, or to a hybrid cell or to an open cell. In this scenario, successful reselection of a WTRU into a CSG cell may not lead to updating its whitelist. Or alternatively, the cell update confirm message to the WTRU may include an IE indicating that the WTRU may not add the CSG ID to its whitelist.

In another embodiment, when a WTRU is in Cell_FACH, a cell update may be accepted on the basis of a temporary membership granted by the target cell, the node playing the HNB GW role for the target cell or the CN. Optionally, the WTRU may be informed to add to its whitelist the CSG to which the target cell (of the cell update procedure) belongs to.

Upon performing access control (CSG cell) or membership verification (hybrid cell), a cell update procedure initiated by a WTRU in Cell_FACH mode may not be successful due to access control result or membership verification result stating that the WTRU does not have valid membership. In order to notify the WTRU, the HNB may, for example, use the RRC connection release procedure. In such a case a new cause may be used (e.g., invalid membership). In another example, the HNB may use an RRC procedure (e.g., cell update reject). This procedure may inform the WTRU that the cell update procedure has been rejected due to invalid membership and thus implicitly instructs the WTRU to reselect to another cell while remaining in Cell_FACH mode. In another example, the HNB may instruct the WTRU to enter Cell_DCH mode. At which point, the CSG/hybrid cell may begin HO to either a non-CSG cell or to a CSG cell where the WTRU has membership. It is noted that in this case the CSG/hybrid cell should inform the WTRU that even though it has been granted temporary membership to the cell it may not add the CSG ID to its whitelist.

In an embodiment, for a successful access control check, a cell update confirm message may include an IE indicating to the WTRU that access control was done and that it should add the CSG ID to its whitelist.

CSG/hybrid cell to CSG/hybrid cell (example HNB to HNB) mobility may be transparent to the CN and anchored at the target cell or at the node playing the HNB-GW role to the target cell. In such a scenario, signaling to the CN may be avoided. In an embodiment, a method is disclosed herein for allowing a modified access control to occur without CN intervention. For example, upon reselecting into a CSG cell, a WTRU may inform the target CSG/hybrid cell (e.g., as a new information element, IE, in the cell update procedure) that its previous cell had the same CSG ID and that it had been accepted as a valid member. In the cell update procedure, the WTRU may provide its previous cell's PCI. Using an HNBAP procedure (i.e. HNB-HNB CSG membership check), the target cell may query the source cell to see what the source cell's CSG ID is and whether the WTRU was recently deemed a member of that CSG ID. The source CSG/hybrid cell may respond with the HNBAP procedure (CSG/hybrid cell access control or membership verification response or confirm message) which can confirm the CSG ID of the source HNB and whether the WTRU was deemed a valid member. It may also include an IE stating when the last access control occurred. In another embodiment, proximity indication can be used to inform the HNB that the previous cell with the same CSG ID was a valid cell.

Various techniques are disclosed herein for allowing the target HNB or the HNB GW to fetch the correct WTRU context even if there are two or more WTRUs sharing the same U-RNTI. For example, a WTRU may provide an identification of the source HNB when it performs a cell update with the target HNB. This identification may be, for example, the primary synchronization code (PSC) of the source HNB. The target HNB then may use the identity of the source HNB together with the U-RNTI to uniquely identify the source HNB that allocated the U-RNTI in question. This information may be forwarded by the target HNB to the HNB GW which may use both identities (source HNB ID and the U-RNTI) to fetch the WTRU context which is unique as the assignee can also be identified (source HNB identity). Hence, the context ID may be unique and the correct WTRU context may be fetched. Other identities that may be provided by the WTRU include the cell ID, or the nodeB ID.

The WTRU may provide the target HNB an additional identification with the U-RNTI. For example, this may be the WTRU's IMSI, or P-TMSI, or TMSI. The target HNB (or alternatively the HNB GW) may use this additional identification in conjunction with the U-RNTI to uniquely fetch a WTRU's context (and/or context ID). The target HNB or the HNB GW may propose to have such WTRU identities saved locally.

The WTRU may be provided its context ID that is used by its serving HNB (or macro NB). This, for example, may occur every time the WTRU transitions from idle to connected mode, and/or at other instances. Thus, during Cell_FACH mobility, the WTRU may include its context ID, together with the U-RNTI, in the cell update message that is sent to the target HNB. The latter may use both identities to fetch the correct WTRU context (this may also be done by the HNB GW after the target forwards the required message towards the HNB GW).

The WTRU may not perform Cell_FACH mobility to HNBs during an ongoing emergency call (e.g., IMS emergency call). This would avoid the issue caused by non-unique U-RNTI and hence the dropping of the RRC connection with a target HNB as a consequence. Thus, if the radio conditions are such that handover is required, the WTRU may first be transitioned to other RRC state, e.g,. Cell_DCH, in which regular handover can occur, for example, inbound handover to CSG.

In accordance with embodiments of the present disclosure, when a CSG capable WTRU or non-CSG capable WTRU detects a cell in a neighbor cell list that it is not a member of, it may restrict activity with the cell. For example, the WTRU may consider the the cell as being barred for a time period, remove the cell from the NCL, or combinations thereof. A value of the time period may be either signaled by the network, be based on an autonomous WTRU determination, or combinations thereof.

Membership verification can be implemented by the WTRU or the network. Membership verification time or performance may be improved by adding the CSG ID for each CSG cell or hybrid cell in the NCL. The WTRU may then immediately perform membership verification and ignore cells that the WTRU is not a member without needing to perform cell detection or making usage of the FACH measurement opportunities for that purpose.

Figure 5:
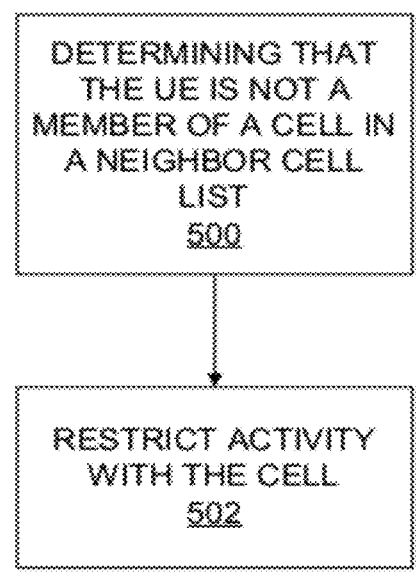
FIG. 5 is a flow chart of an example method of handling a neighbor cell list in accordance with embodiments of the present disclosure.

FIG. 5 illustrates a flow chart of an example method of handling a neighbor cell list in accordance with embodiments of the present disclosure. The method of FIG. 5 may be implemented by suitable WTRU such as the WTRU shown in FIG. 2. Referring to FIG. 5, the method may include determining that the WTRU is not a member of a cell in an NCL (step 500). For example, the WTRU 102 shown in FIG. 2 may determine that it is not a member of a cell in an NCL. In response to determining that it is not a member of the cell in the NCL, the WTRU may restrict activity with the cell (step 502).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed:

1. A method for enabling mobility of a wireless transmit/receive unit (WTRU) in a cell forward access channel (CELL_FACH) state, the method comprising:
   receiving high speed downlink shared channel (HS-DSCH) traffic from a source cell configured for a first frequency;
   receiving, from a network node, a forward access channel (FACH) measurement occasion or a discontinuous reception (DRX) length for performing measurement on target cells;
   receiving, from the network node, an extended FACH measurement occasion or an extended DRX length for performing inter-frequency measurements on closed subscriber group (CSG) target cells or hybrid target cells, wherein the extended FACH measurement occasion or the extended DRX length for performing the inter-frequency measurements on the CSG target cells or the hybrid target cells is greater than the FACH measurement occasion or the DRX length for performing the measurements on the target cells;
   determining, at the WTRU, whether the WTRU is within a proximity to a CSG target cell or a hybrid target cell configured for a second frequency while in the CELL_FACH state;
   when the WTRU is determined to be within the proximity to the CSG target cell or the hybrid target cell configured for the second frequency while in the CELL_FACH state, stopping receipt of the HS-DSCH traffic from the source cell for a period of the extended FACH measurement occasion or the extended DRX length to perform the inter-frequency measurements on the CSG target cell or the hybrid target cell to determine whether to perform reselection; and when the WTRU is determined to be within a proximity to a target cell, stopping receipt of the HS-DSCH traffic from the source cell for a period of the FACH measurement occasion or the DRX length to perform the measurements on the target cell to determine whether to perform reselection.

2. The method of claim 1, wherein the extended FACH measurement occasion or the extended DRX length is used to read a system information block (SIB) associated with the CSG target cell or the hybrid target cell.

3. The method of claim 1, comprising applying a backoff timer, and
wherein the extended FACH measurement occasion or the extended DRX length is utilized on an expiration of the backoff timer.

4. The method of claim 1, further comprising receiving an indication that the network node will prevent transmission of the HS-DSCH traffic to the WTRU during the extended FACH measurement occasion or the extended DRX length.

5. The method of claim 1, wherein the extended FACH measurement occasion or the extended DRX length comprises a multiple of the FACH measurement occasion or the DRX length.

6. The method of claim 1, further comprising:
sending a request to the network node for the extended FACH measurement occasion or the extended DRX length; and
receiving the extended FACH measurement occasion or the extended DRX length in response to the request.

7. The method of claim 6, wherein the request is sent to the network node when the proximity of the WTRU to the CSG target cell or the hybrid target cell is within a predetermined threshold.

8. The method of claim 6, wherein sending the request comprises sending the request via radio resource control (RRC) messaging.

9. The method of claim 6, wherein sending the request comprises sending the request via a cell update message.

10. The method of claim 6, wherein the extended FACH measurement occasion or the extended DRX length are received in an acknowledgment message from the network node for acknowledging receipt of the request for the extended FACH measurement occasion or the extended DRX length.

11. A wireless transmit/receive unit (WTRU) comprising:
a transceiver configured to:
receive high speed downlink shared channel (HS-DSCH) traffic from a source cell configured for a first frequency;
receive, from a network node, a forward access channel (FACH) measurement occasion or a discontinuous reception (DRX) length for performing measurements on target cells;
receive, from the network node, an extended FACH measurement occasion or an extended DRX length for performing inter-frequency measurement on closed subscriber group (CSG) target cells or hybrid target cells, wherein the extended FACH measurement occasion or the extended DRX length for performing the inter-frequency measurements on the CSG target cells or the hybrid target cells is greater than the FACH measurement occasion or the DRX length for being performed on the target cells; and
a processor configured to:
determine whether the WTRU is within a proximity to a CSG target cell or a hybrid target cell configured for the second frequency while in a cell forward access channel (CELL_FACH) state;
when the WTRU is determined to be within the proximity to the CSG target cell or the hybrid target cell while in the CELL_FACH state, stop receipt of the HS-DSCH traffic from the source cell for a period of the extended FACH measurement occasion or the extended DRX length to perform the inter-frequency measurements on the CSG target cell or the hybrid target cell to determine whether to perform reselection; and
when the WTRU is determined to be within the proximity to a target cell, stop receipt of the HS-DSCH traffic from the source cell for a period of the FACH measurement occasion or the DRX length to perform the measurements on the target cell to determine whether to perform reselection.

12. The WTRU of claim 11, wherein the extended FACH measurement occasion or the extended DRX length is used to read a system information block (SIB) associated with the CSG target cell or the hybrid target cell.

13. The WTRU of claim 11, wherein the processors is further configured to receive an indication that the network node will prevent transmission of the HS-DSCH traffic to the WTRU during the extended FACH measurement occasion or the extended DRX length.

14. The WTRU of claim 11, wherein the extended FACH measurement occasion or the extended DRX length comprises a multiple of the FACH measurement occasion or the DRX length.

15. The WTRU of claim 11, wherein the processor is configured to apply a backoff timer, and wherein the processor is configured to utilize the extended FACH measurement occasion or the extended DRX length on an expiration of the backoff timer.

16. The WTRU of claim 11, wherein the processor is configured to:
send, via the transceiver, a request to the network node for the extended FACH measurement occasion or the extended DRX length; and
receive the extended FACH measurement occasion or the extended DRX length in response to the request.

17. The WTRU of claim 16, wherein the processor is configured to send the request to the network node when the proximity of the WTRU to the CSG target cell or the hybrid target cell is within a predetermined threshold.

18. The WTRU of claim 16, wherein the processor is configured to send the request via RRC messaging.

19. The WTRU of claim 16, wherein the processor is configured to send the request via a cell update message.

20. The WTRU of claim 16, wherein the the transceiver is configured to receive the extended FACH measurement occasion or the extended DRX length in an acknowledgement message from the network node for acknowledging receipt of the request for the extended FACH measurement occasion or the extended DRX length.

* * * * *